(12) United States Patent
Huberman et al.

(10) Patent No.: US 10,352,708 B1
(45) Date of Patent: Jul. 16, 2019

(54) METHOD AND SYSTEM FOR MOBILE DEVICE LOCALIZATION USING BAROMETRIC FINGERPRINT

(71) Applicant: MAPSTED CORP., Missisauga (CA)

(72) Inventors: Sean Huberman, Guelph (CA); Naiyu Chen, Mississauga (CA)

(73) Assignee: MAPSTED CORP., Mississauga, Ontario (CA)

( * ) Notice: Subject to any disclaimer, the term of this patent is extended or adjusted under 35 U.S.C. 154(b) by 0 days.

(21) Appl. No.: 16/029,687

(22) Filed: Jul. 9, 2018

(51) Int. Cl.
*G01C 21/20* (2006.01)
*G01C 5/06* (2006.01)
*G01S 19/53* (2010.01)
*G01S 19/42* (2010.01)

(52) U.S. Cl.
CPC ............ *G01C 21/206* (2013.01); *G01C 5/06* (2013.01); *G01S 19/42* (2013.01); *G01S 19/53* (2013.01)

(58) Field of Classification Search
CPC ....... G01C 21/2016; G01C 5/06; G01S 19/42; G01S 19/53; G01S 5/12; G01S 5/02; G01S 19/00; G01S 19/38; H04B 7/18508
USPC .................................................. 342/357.21
See application file for complete search history.

(56) References Cited

U.S. PATENT DOCUMENTS

| | | |
|---|---|---|
| 2009/0043504 A1 | 2/2009 | Bandyopadhyay et al. |
| 2009/0248301 A1 | 10/2009 | Judd et al. |
| 2013/0150076 A1 | 6/2013 | Kim et al. |
| 2016/0334218 A1* | 11/2016 | Heshmati ............... G01B 21/00 |
| 2016/0379074 A1 | 12/2016 | Nielsen et al. |
| 2018/0206078 A1* | 7/2018 | Venkatraman ........ H04W 4/043 |
| 2018/0255434 A1* | 9/2018 | Ivanov .................. H04W 4/043 |

* cited by examiner

Primary Examiner — Harry K Liu
(74) Attorney, Agent, or Firm — Henry L Ohab

(57) ABSTRACT

A method and system of localizing a mobile device having a processor and a memory. The method comprises monitoring, using the processor and the memory, mobile device barometric data along a sequence of positions describing a route being traversed, accessing, using the processor, a repository of barometric fingerprint data associated with respective positions along the route, and using the processor, localizing the mobile device based at least in part on matching a mobile device barometric pattern segment with a correlating pattern segment of the barometric fingerprint data of the repository, the mobile device barometric pattern segment derived at least partly based on ambient barometric pressure measurements associated with at least a pair of contiguous positions in the sequence of positions describing the route.

18 Claims, 6 Drawing Sheets

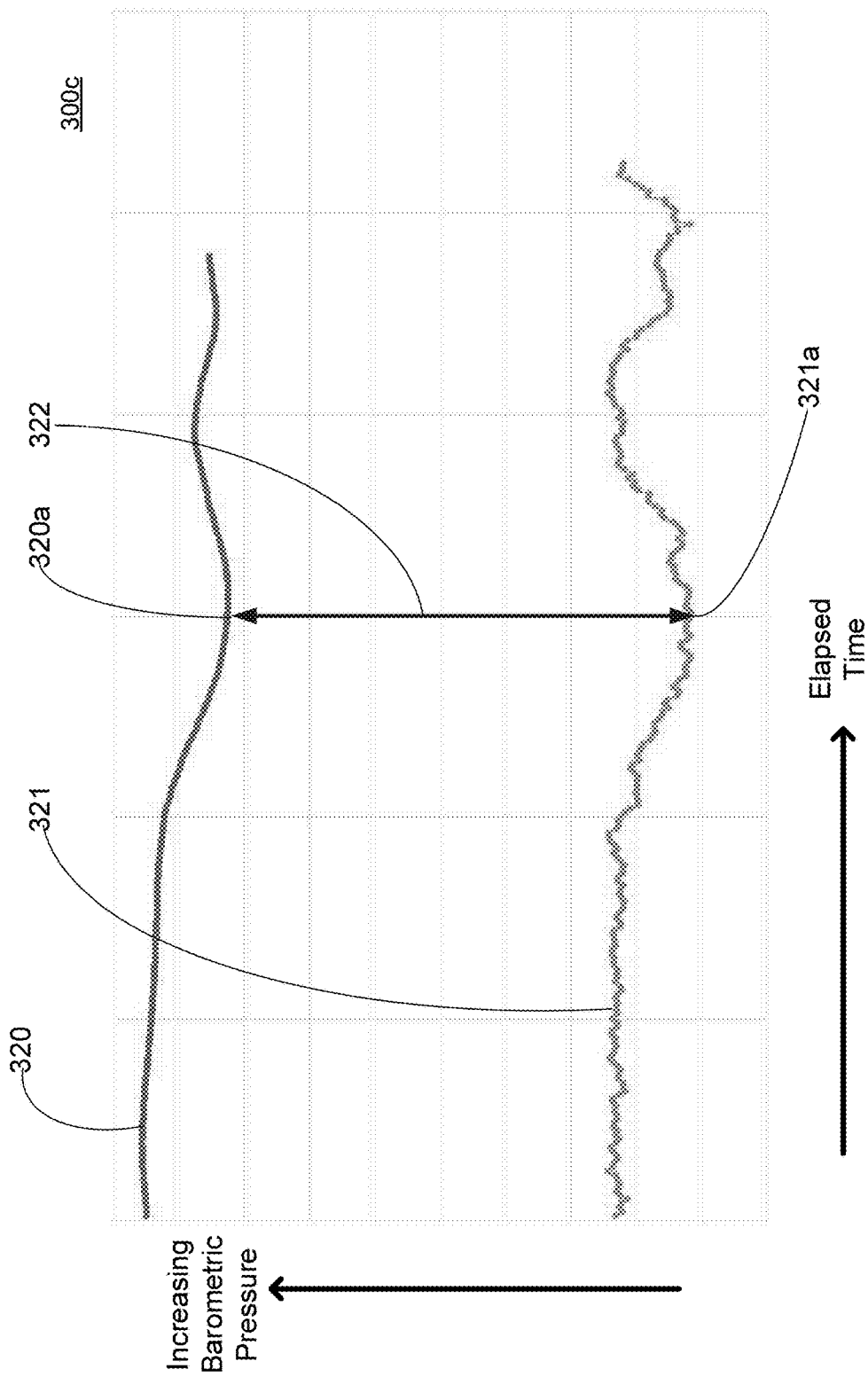

```
                                    400
```

| Monitoring mobile device barometric data along a sequence of positions describing a route being traversed 410 |

↓

| Accessing a repository of barometric fingerprint data associated with respective positions along the route 420 |

↓

| Localizing the mobile device based at least in part on matching a mobile device barometric pattern segment with a correlating pattern segment of the barometric fingerprint data of the repository, the mobile device barometric pattern segment derived at least partly based on ambient barometric pressure measurements associated with at least a pair of contiguous positions in the sequence of positions describing the route 430 |

FIG. 4

METHOD AND SYSTEM FOR MOBILE DEVICE LOCALIZATION USING BAROMETRIC FINGERPRINT

TECHNICAL FIELD

The disclosure herein relates to the field of mobile device navigation and positioning.

BACKGROUND

Users of mobile devices, including smartphones, tablets and wearable computing devices, are increasingly using and depending upon indoor positioning and navigation applications and features. Seamless, accurate and dependable indoor positioning of a mobile device as carried or worn by a user can be difficult to achieve using satellite-based navigation systems when the latter becomes unavailable, or sporadically available, and therefore unreliable, such as within enclosed or partially enclosed urban infrastructure and buildings, including hospitals, shopping malls, airports, universities and industrial warehouses. Wireless communication signal data, ambient barometric data and magnetic field data may be measured to aid in localizing a mobile device along a route traversed within indoor infrastructure. Variations in environmental or ambient conditions, however, and also varying barometric pressure sensor characteristics inherent to different mobile devices, has adversely affected the usefulness of barometric fingerprint data, posing a challenge to wider application of barometric data in localizing mobile devices.

BRIEF DESCRIPTION OF THE DRAWINGS

FIG. 3C illustrates, in yet another embodiment, variations in barometric data detected and measured according to respective mobile devices and under varying environmental conditions.

FIG. 4 illustrates, in an example embodiment, a method of localizing a mobile device based on barometric fingerprint data.

DETAILED DESCRIPTION

Figure 1:
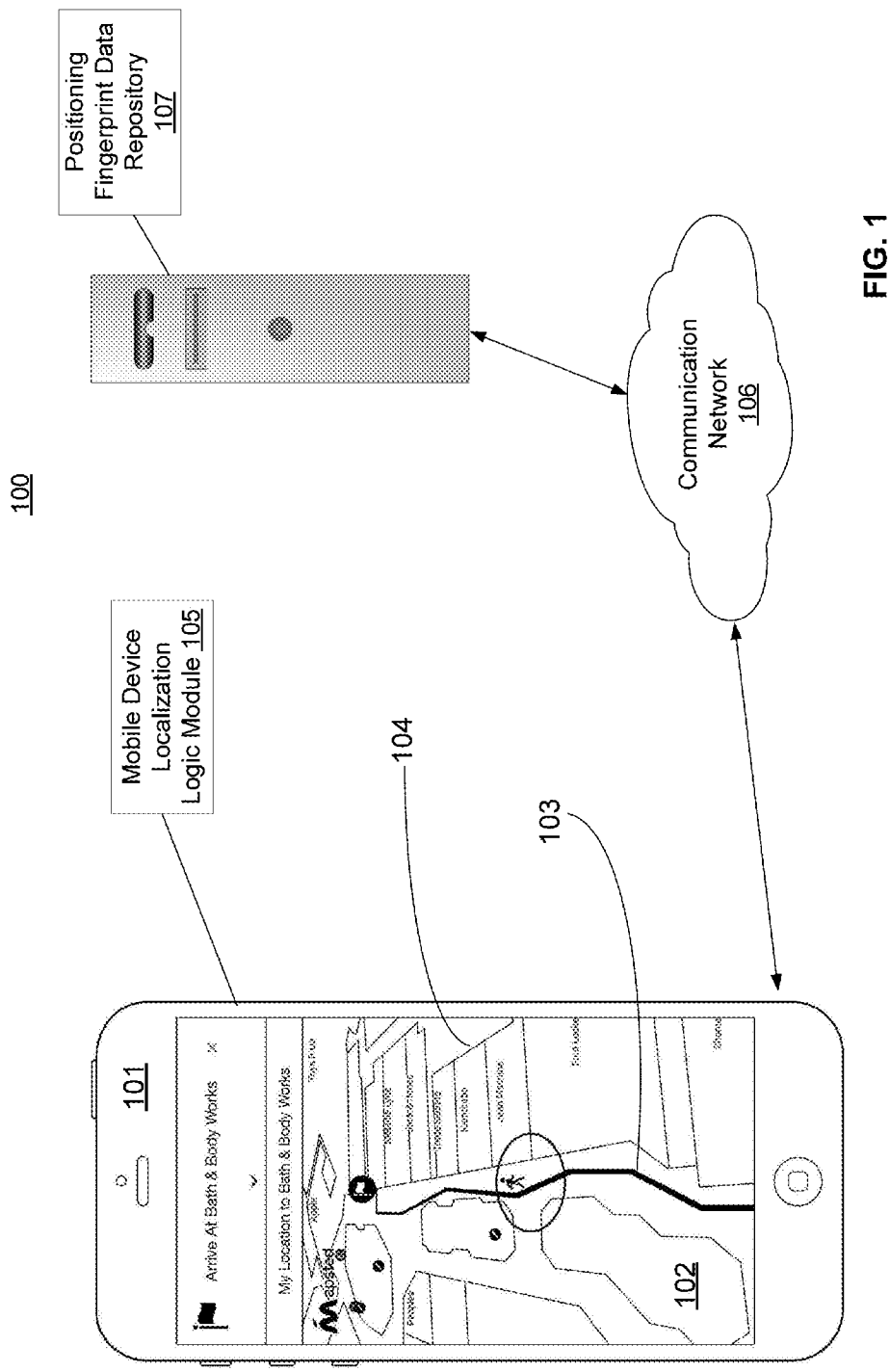
FIG. 1 illustrates, in an example embodiment, a system for localizing a mobile device.

Embodiments herein recognize that temporal variations and fluctuations in environmental or ambient barometric conditions, and also varying barometric measurement sensor characteristics inherent to different mobile devices, can adversely affect the usefulness of applying barometric data values as measured for localizing mobile devices. Among other technical effects and advantages, embodiments herein provide for utilizing a pattern, or a signature, of barometric data measurements established over a spatial route being traversed, as opposed to absolute values of the barometric data measurements, for localizing a mobile device. The inventors herein recognize that using a spatial pattern enables the relative changes in barometric pressure to be considered for localizing a mobile device traversing particular locations or positions sequentially within an area and may provide a unique barometric data signature or pattern across different mobile devices, even under temporally varying environmental or ambient pressure conditions, notwithstanding differing mobile device absolute values of barometric pressure measurements in such situations. The inventors also recognize that mobile device trends or patterns of barometric pressure over a space or area being traversed may enable localization in a robust and repeatable manner across different phones. In effect such mobile devices, while measuring different barometric pressure absolute values, may be normalized to may exhibit a same, or significantly similar, barometric data trend, pattern, or signature.

Embodiments herein provide a method for localizing a mobile device having a processor and a memory. In particular, The method comprises monitoring, using the processor and the memory, mobile device barometric data along a sequence of positions describing a route being traversed, accessing, using the processor, a repository of barometric fingerprint data associated with respective positions including the route, and using the processor, localizing the mobile device based at least in part on matching a mobile device barometric pattern segment with a correlating pattern segment of the barometric fingerprint data of the repository, the mobile device barometric pattern segment derived at least partly based on ambient barometric pressure measurements associated with at least a pair of contiguous positions in the sequence of positions describing the route. The matching provides a basis for determining a unique location, or position, of a mobile device traversing a route or trajectory in two- or three-dimensional space. The latter process of determining a unique location or position of the mobile device in two- or three-dimensional space is referred to herein as localizing the mobile device, or mobile device localization.

Also provided is a mobile device including a processor and a memory storing a set of computer instructions. The instructions are executable in the processor to monitor the mobile device barometric data along a sequence of positions describing a route being traversed, access a repository of barometric fingerprint data associated with respective positions including the route, and localize the mobile device based at least in part on matching a mobile device barometric pattern segment with a correlating pattern segment of the barometric fingerprint data of the repository, the mobile device barometric pattern segment derived at least partly based on ambient barometric pressure measurements associated with at least a pair of contiguous positions in the sequence of positions describing the route.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

A mobile device as described herein may be implemented, in whole or in part, on mobile computing devices such as cellular or smartphones, laptop computers, wearable computer devices, and tablet devices. Memory, processing, and network resources may all be used in connection with the use and performance of embodiments described herein, including with the performance of any method or with the implementation of any system.

Furthermore, one or more embodiments described herein may be implemented through the use of logic instructions that are executable by one or more processors. These instructions may be carried on a computer-readable medium. In particular, machines shown with embodiments herein include processor(s) and various forms of memory for storing data and instructions. Examples of computer-readable mediums and computer storage mediums include portable memory storage units, and flash memory (such as carried on smartphones). A mobile device as described herein utilizes processors, memory, and logic instructions stored on computer-readable medium. Embodiments described herein may be implemented in the form of computer processor-executable logic instructions or programs stored on computer memory mediums.

System Description

FIG. 1 illustrates, in an example embodiment, mobile device localization system 100 including mobile device 101. Mobile device 101 may be such as a cellular or smartphone, a laptop or a tablet computer, or a wearable computer device that is operational for any one or more of telephony, messaging, and data computing. Mobile device 101 may be connected within a computer network system, including the internet or other wide area network, to one or more remote server computing devices. Mobile device 101 may include mobile device localization logic module 105, the latter embodied according to computer processor-executable instructions stored within a memory of, or otherwise accessible to a processor of, mobile device 101. In alternate embodiments, it is contemplated that one or more portions of mobile device localization logic module 105 may be stored at the remote server computing devices, while being communicatively accessible to mobile device 101 via communication network 106.

A navigation, or positioning, software application downloaded and installed, or stored, in a memory of mobile device 101 may render physical layout map 102 related to a facility or building within a user interface display of mobile device 101. In one embodiment, the navigation software application may incorporate mobile device localization logic module 105. The terms indoor facility or building as used herein means an at least partially enclosed building having at least one fixed boundary, such as an exterior boundary wall. Display of physical layout map 102 may further show trajectory or route 103 constituted of a sequence of spatial positions traversed by the mobile device, which may include an estimated trajectory segment predicted for traversal by mobile device 101. Physical layout map 102 may further depict one or more map constraint features 104, such as an internal wall or other map constraint feature including a doorway, a facility exit, a physical marker fixed in place, a facility entrance, a stairwell, a stairway, a corridor, an elevator, and an external boundary outline of the indoor facility.

Positioning fingerprint data repository 107, hosted at a server computing device in one embodiment, may be communicatively accessible to mobile device 101, via communication network 106. In alternate embodiments, positioning fingerprint data repository 107, or any portion(s) thereof, may be stored in a memory of mobile device 101. The terms fingerprint and fingerprint data as used herein refer to time-correlated, individual measurements of any of, or any combination of, received wireless communication signal strength and signal connectivity parameters, magnetic field measurements and barometric pressure measurements, and mobile device inertial sensor data at known, particular locations within an area being traversed, or anticipated for traversal, by the mobile device. In other words, a fingerprint includes a correlation of sensor and signal information including, but not necessarily limited to wireless signal strength, magnetic and barometric data, and inertial sensor information time-correlated for respective positions or coordinate locations within the area or facility being traversed. Thus, barometric fingerprint data associated with contiguous locations or positions may establish a pattern or signature that uniquely correlates to that particular sequence of locations or positions. Once a particular as-measured value, a pattern or signature based on any one or more of received wireless communication signal strength and signal connectivity parameters, magnetic field parameters or barometric pressure parameters, and mobile device inertial sensor data is detected or recorded by mobile device 101, the value or pattern as detected may be matched to a reference fingerprint stored in a fingerprint map of a given facility, for example as stored in positioning fingerprint data repository 107, to identify the unique position of the mobile device relative to the facility, a process also referred to herein as localization. A sequence of positions or locations that constitute a navigation path traversed by mobile device 101 relative to the indoor facility may be mapped for fingerprint data during a fingerprint calibration process. In some embodiments, given that sampling times and sampling rates applied in conjunction with particular mobile device sensors may be different, the signal and sensor information as measured during a fingerprint calibration process may be time-averaged across particular periods of time, with the time-averaged value being used to represent the signal information at any given instance of time within that particular period of time in which the signal information is time-averaged. Fingerprint data may be used to track mobile device 101 traversal along route 103 within, and even adjoining, the indoor facility.

Figure 2:
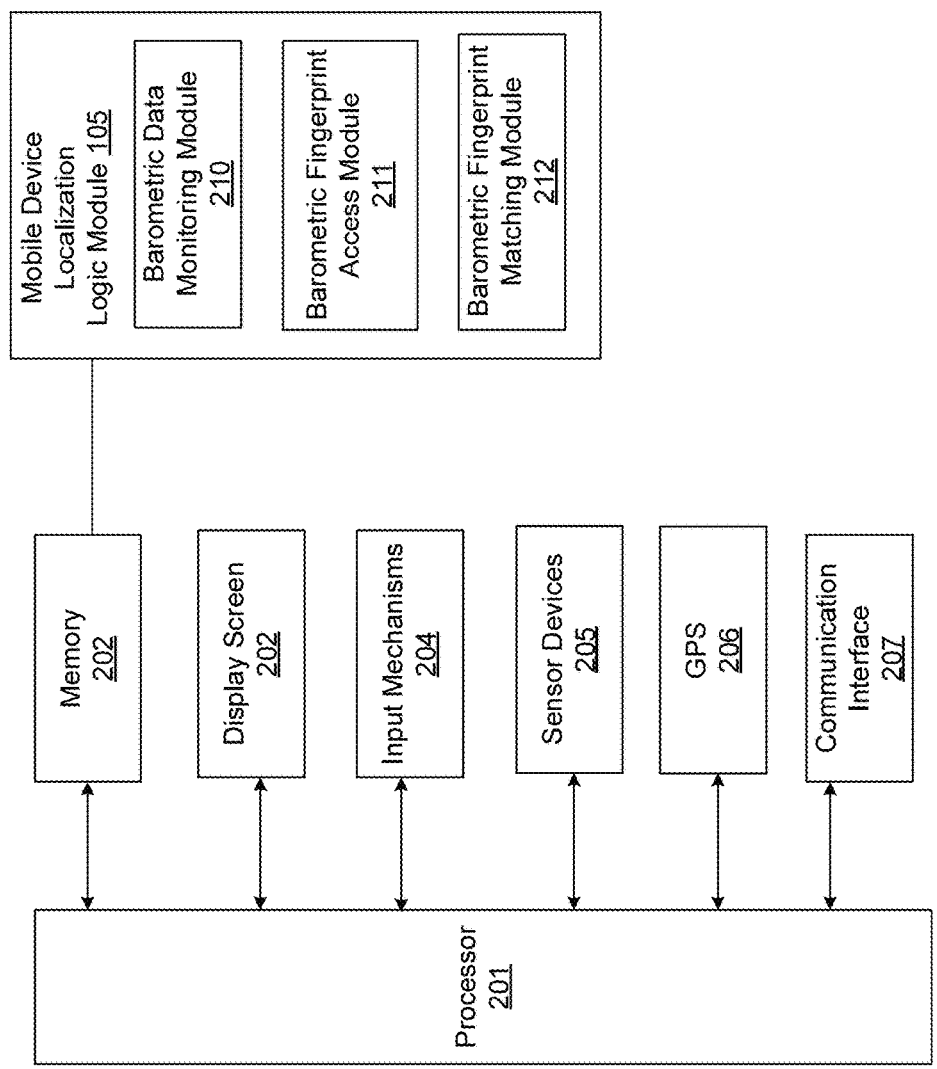
FIG. 2 illustrates, in one example embodiment, an architecture of a mobile device including localization capability based on a barometric fingerprint.

FIG. 2 illustrates an architecture of mobile device 101 having a barometric pressure measurement capability, in one embodiment. Mobile device 101 may include processor 201, memory 202, display screen 203, input mechanisms 204 such as a keyboard or software-implemented touchscreen input functionality, barcode, QR code or other symbol- or code-scanner input functionality. Mobile device 101 may include sensor functionality by way of sensor devices 205. Sensor devices 205 may include inertial sensors such as an accelerometer and a gyroscope, magnetometer or other magnetic field sensing functionality, barometric or other ambient pressure sensing functionality, and ambient lighting sensors, such as to detect ambient lighting intensity. Mobile device 101 may also include capability for detecting and communicatively accessing ambient wireless communication signals including but not limited to any of Bluetooth and Bluetooth Low Energy (BLE), Wi-Fi, RFID, and also satellite-based navigations signals including global positioning system (GPS) signals. Mobile device 101 further includes the capability for detecting, via sensor devices 205, and measuring a received signal strength, and of determining signal connectivity parameters, related to the ambient wireless signals. In particular, mobile device 101 may include location determination capability such as by way of GPS module 206 having a GPS receiver, and communication interface 207 for communicatively coupling to communication network 106, including by sending and receiving cellular data over data and voice channels.

Mobile device localization logic module 105 includes instructions stored in memory 202 of mobile device 101. In embodiments, mobile device localization logic module 105 may be included in a mobile device navigation application program stored in memory 202 of mobile device 101. The term indoor location as used herein refers to a location within the facility or building, such as within a shopping mall, an airport, a warehouse, a university campus, or any at least partially enclosed building. Mobile device localization logic module 105 may comprise sub-modules including barometric data monitoring module 210, barometric fingerprint access module 211 and barometric fingerprint matching module 212.

Processor 201 uses executable instructions stored in barometric data monitoring module 210 to monitor mobile device 101 barometric data as measured along a sequence of positions constituting route 103 being traversed.

Processor 201 uses executable instructions stored in barometric fingerprint access module 211 to access fingerprint data of repository 107 associated with respective positions along route 103. The fingerprint data of repository 107 includes barometric fingerprint data.

Processor 201 uses executable instructions stored in barometric fingerprint matching module 212 to localize mobile device 101 based at least in part on matching a mobile device barometric pattern segment with a correlating pattern segment of the barometric fingerprint data of the repository. The mobile device barometric pattern segment may be derived at least partly based on ambient barometric pressure measurements, as measured by mobile device 101, associated with at least a pair of contiguous positions in the sequence of positions describing route 103.

In embodiments, mobile device 101 barometric data establishes a pattern for a set of barometric data measurements along route 103, the pattern, or pattern segment, may be constituted of any 2 or more contiguous positions in a sequence of positions describing route 103 under traversal by mobile device 101. Barometric fingerprint matching module 212 matches the pattern segment with an identified correlating pattern, which may be a portion of a larger fingerprint pattern, from repository 107 storing the barometric fingerprint data. Mobile device 101 may be localized by identifying, based on the matching, a position of mobile device 101 among respective positions or locations along route 103 associated with the pattern or trend as indicated by the barometric data of the fingerprint map accessible at repository 107. In one embodiment, mobile device 101 barometric data as measured along route 103 may be added to the cumulatively-acquired barometric fingerprint data of repository 107.

In an embodiment, the matching of mobile device 102 pattern segment matching with barometric fingerprint data of repository 107 further identifies a floor number of a multi-floor building being traversed by mobile device 101 that at least partially includes the route. In effect, the barometric pattern segment may be matched in view of its unique occurrence in association with a particular floor or floor number.

In another variation, in preparation for the matching, the barometric pattern segment as derived from barometric pressure measurements acquired at mobile device 102 may be algorithmically smoothed, for example, using a triangular smoothing algorithm. Other curve or trend smoothing techniques may be applied, such as a butterworth filter, kalman filter, kernel smoother, low-pass filter, exponential moving average. In yet another variation, the smoothing may be performed on the barometric pattern segment as derived from barometric pressure measurements acquired at mobile device 102 prior to adding same to the cumulatively-acquired barometric fingerprint data of repository 107.

Figure 3A:
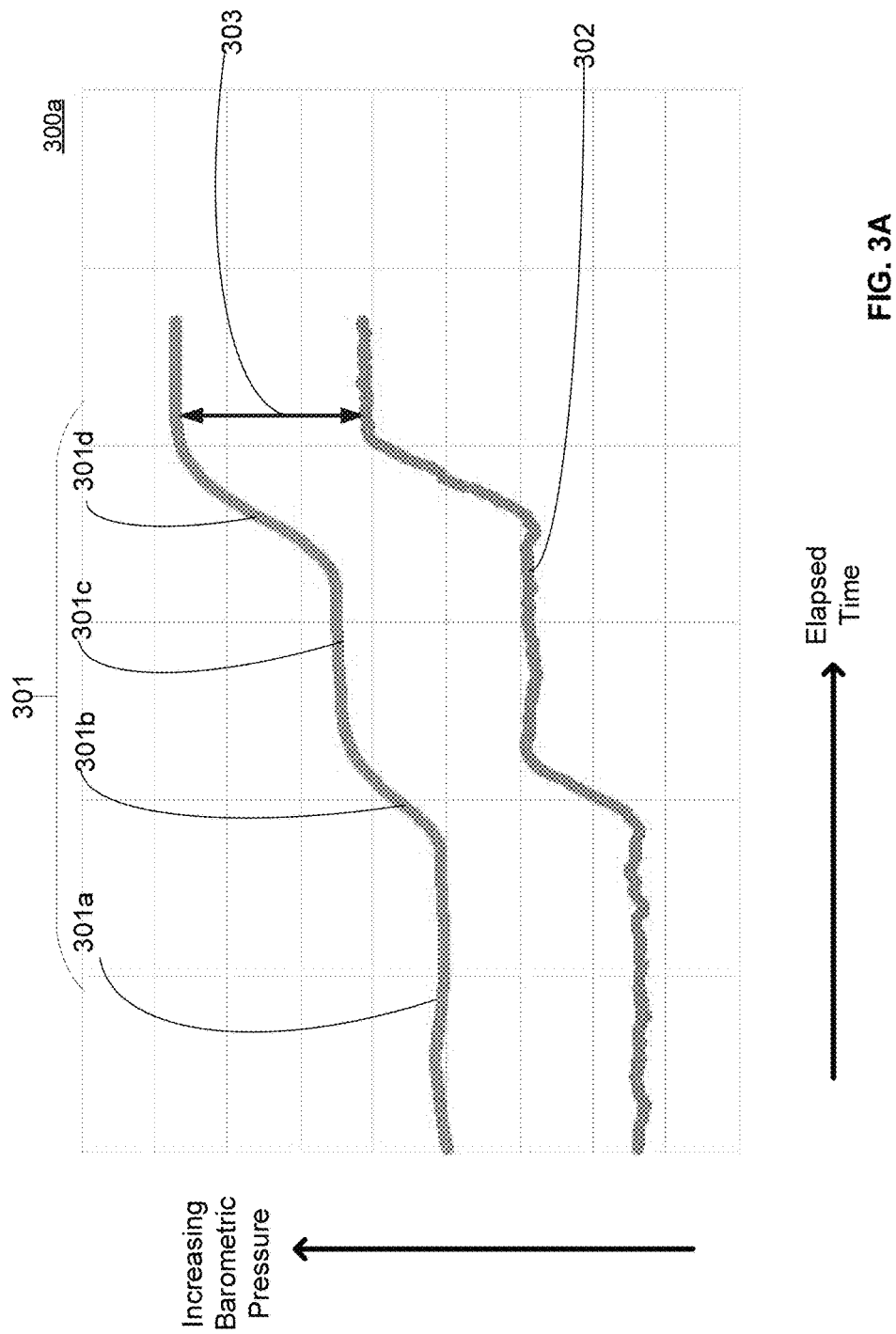
FIG. 3A illustrates variations in barometric data detected and measured according to respective mobile devices and under varying environmental conditions.

FIG. 3A depicts barometric pressure patterns 301 and 302, in an embodiment 300a during walking down a series of floors of a multi-floor building, as acquired by mobile device 101 at different times subject to variations or fluctuations in ambient barometric pressure. It is observed that a flat or generally horizontal pattern segments 301a, 301c may occur while traversing horizontally across a same-floor of the multi-floor building, while ramp pattern segments 301b, 301d may indicate traversing the stairs of the building. Barometric pressure pattern segment 302 may be offset from barometric pressure pattern segment 301 by substantially constant amount 303, reflecting a lower ambient pressure at the particular time of the same-route traversal by mobile device 101. It is observed that while the barometric pressure data as measured by mobile device 101 at a given spatial location in the facility might differ in absolute magnitudes by substantially constant amount 303, the spatial patterns in variation or trend of the respective absolute measurements provide substantially similar and comparable pattern signatures.

In another embodiment, barometric pressure patterns 301 and 302, in an embodiment during walking down a series of floors of a multi-floor building, as acquired by respective ones of a pair of different mobile devices mobile at a same time and even without fluctuations in ambient pressure conditions. Again, a flat or generally horizontal pattern segments 301a, 301c may occur while traversing horizontally across a same-floor of the multi-floor building, while ramp pattern segments 301b, 301d may indicate traversing down the stairs of the building. Barometric pressure pattern segment 302 may be offset from barometric pressure pattern segment 301 by substantially constant amount 303, reflecting differences in barometric sensor characteristics assembled and utilized in the respective mobile devices. Again, while the barometric pressure data as measured by each of the different mobile devices at a given spatial location in the facility might differ in absolute magnitudes by substantially constant amount 303, the spatial patterns in variation or trend of the respective absolute measurements provide substantially similar and comparable pattern signatures. Using the barometric pattern signatures, rather than absolute barometric pressure measurements, in effect provide for normalizing barometric pressure differences due to temporal fluctuations in ambient pressure conditions, or also due to differences in barometric pressure sensor characteristics across different mobile devices.

Figure 3B:
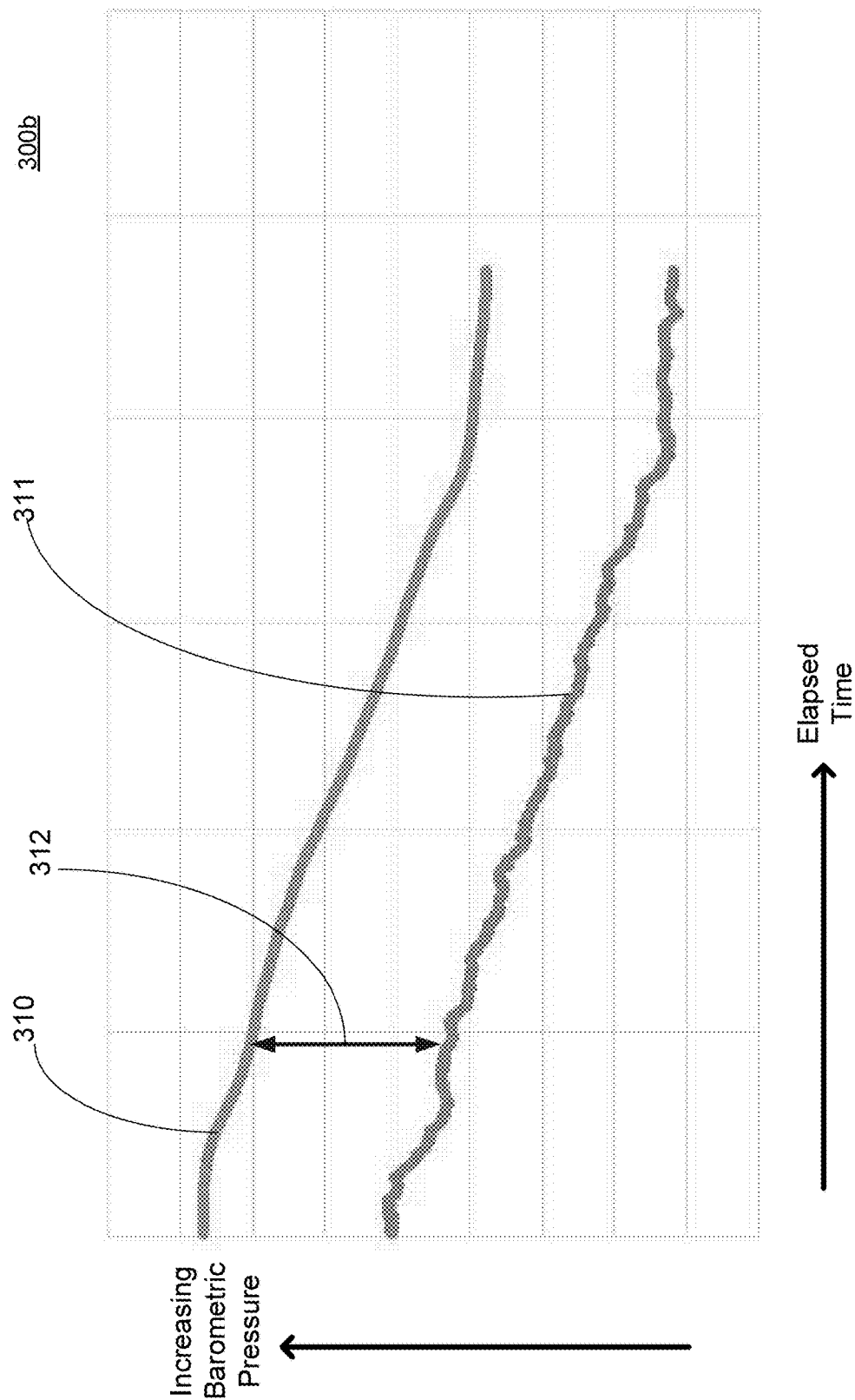
FIG. 3B illustrates, in another embodiment, variations in barometric data detected and measured according to respective mobile devices and under varying environmental conditions.

FIG. 3B depicts barometric pressure patterns 310 and 311 in an embodiment 300b of taking an elevator upwards from a lower floor toward a higher floor in a multi-floor building. Barometric pressure pattern segment 310 may be offset from barometric pressure pattern segment 311 by substantially constant amount 312, reflecting a lower ambient pressure at the particular time of the same-route traversal by mobile device 101. In another variation, barometric pressure pattern segment 310 may be offset from barometric pressure pattern segment 311 formed by respective ones of a pair of different mobile devices, and reflective of differences in barometric sensor characteristics assembled and utilized in the respective mobile devices. Again, while the barometric pressure data as measured by each of the different mobile devices at a given spatial location in the facility might differ in absolute magnitudes by substantially constant amount 312, the barometric spatial patterns 310, 311 in variation or trend of the respective absolute measurements provide substantially similar and comparable pattern signatures. Again, using the barometric pattern signatures, rather than absolute barometric pressure measurements, in effect provides for normalizing barometric pressure differences due to temporal fluctuations in ambient pressure conditions, or also due to differences in barometric pressure sensor characteristics across different mobile devices.

FIG. 3C depicts barometric pressure patterns 320 and 321 in an embodiment 300c of walking along a same-floor of an indoor facility that includes a change in vertical height, such as for a mezzanine level set of stairs. Again, while barometric pressure patterns segments 320, 321 due to temporal fluctuations in ambient barometric pressure may be offset by generally constant amount of barometric pressure 322, it will be appreciated that the of barometric pressure patterns segments 320, 321 are substantially similar in curvature and trend characteristics including a slope and a change in slope of the patterns. For example, barometric pressure measurement 320a may be correlated with barometric pressure measurement 321a, the latter being generally offset lower than the former by generally constant amount of barometric pressure 322. Again, t will be appreciated that using the barometric pattern signatures, rather than absolute barometric pressure measurements, in effect provides for normalizing barometric pressure differences due to temporal fluctuations in ambient pressure conditions, or also due to differences in barometric pressure sensor characteristics that might exist across different mobile devices.

Methodology

FIG. 4 illustrates, in an example embodiment, a method of localizing mobile device 101 based at least partly on a barometric fingerprint. In describing examples of FIG. 4, reference is made to the examples of FIGS. 1 through 3A-3C for purposes of illustrating suitable components or elements for performing a step or sub-step being described.

Examples of method steps described herein relate to the use of mobile device 101 for implementing the techniques described. According to one embodiment, the techniques are performed by mobile device localization logic module 105 of mobile device 101 in response to the processor 201 executing one or more sequences of software logic instructions that constitute mobile device localization logic module 105. In embodiments, mobile device localization logic module 105 may include the one or more sequences of instructions within sub-modules including barometric data monitoring module 210, barometric fingerprint access module 211 and barometric fingerprint matching module 212. Such instructions may be read into memory 202 from machine-readable medium, such as memory storage devices. In executing the sequences of instructions contained in barometric data monitoring module 210, barometric fingerprint access module 211 and barometric fingerprint matching module 212 of mobile device localization logic module 105 in memory 202, processor 201 performs the process steps described herein. In alternative implementations, at least some hard-wired circuitry may be used in place of, or in combination with, the software logic instructions to implement examples described herein. Thus, the examples described herein are not limited to any particular combination of hardware circuitry and software instructions. Additionally, it is contemplated that in alternative embodiments, the techniques herein, or portions thereof, may be distributed between the mobile device 101 and a remote server computing device. For example, the mobile device may collect and transmit data to the server that, in turn, performs at least some portion of the techniques described herein.

At step 410, processor 201 executes instructions included in barometric data monitoring module 210, to monitor mobile device 101 barometric data along a sequence of positions, or locations, describing a route 103 being traversed. The positions or locations may be expressed in accordance with either a local or global (X, Y, Z) coordinate system.

In embodiments, mobile device 101 barometric data may include a set of barometric ambient pressure measurements based on one or more barometric sensors of mobile device 101, along route 103. Route 103 being traversed may be such as a hallway, a corridor, a pedestrian path, a set of stairs or a route commencing from any of an entrance, an exit or a location within or near a building.

At step 420, processor 201 executes instructions included in barometric fingerprint matching module 212 to access repository 107 of barometric fingerprint data associated with respective positions along route 103. In embodiments, the fingerprint map data stored in fingerprint data repository 107 (also referred to herein as repository 107) further associates respective positions along route 103 within the area or facility with a unique combination of fingerprint data, including gyroscope data, accelerometer data, wireless signal strength data, wireless connectivity data, barometric data, acoustic data, line-of sight data, ambient lighting data, and magnetic data.

In embodiments, the data of repository 107 may be accessible in memory 202 of mobile device 101, and also accessible from a server computing device via wireless communication network 106.

At step 430, processor 201 executes further instructions included in barometric fingerprint matching module 212 to localize mobile device 101 based at least partly on matching a barometric data pattern segment as measured by mobile device 101 barometric data with the barometric fingerprint data of repository 107.

In embodiments, mobile device 101 barometric data establishes a pattern for a set of barometric data measurements along route 103, the pattern, or pattern segment, may be constituted of any 2 or more contiguous positions in a sequence of positions describing route 103 under traversal by mobile device 101. Barometric fingerprint matching module 212 matches the pattern segment with an identified correlating pattern, which may be a portion of a larger fingerprint pattern, from repository 107 storing the barometric fingerprint data. Mobile device 101 may be localized by identifying, based on the matching, a position of mobile device 101 among respective positions or locations along route 103 associated with the pattern or trend as indicated by the barometric data of the fingerprint map accessible at repository 107. In one embodiment, mobile device 101 barometric data as measured along route 103 may be added to the cumulatively-acquired barometric fingerprint data of repository 107.

In an embodiment, the matching of mobile device 102 pattern segment matching with barometric fingerprint data of repository 107 further identifies a floor number of a multi-floor building being traversed by mobile device 101 that at least partially includes the route. In effect, the barometric pattern segment may be matched in view of its unique occurrence in association with a particular floor or floor number.

In another variation, in preparation for the matching, the barometric pattern segment as derived from barometric pressure measurements acquired at mobile device 102 may be algorithmically smoothed, for example, using a triangular smoothing algorithm. Other curve or trend smoothing techniques may be applied, such as a butterworth filter, kalman filter, kernel smoother, low-pass filter, exponential moving average. In yet another variation, the smoothing may be performed on the barometric pattern segment as derived from barometric pressure measurements acquired at mobile device 102 prior to adding same to the cumulatively-acquired barometric fingerprint data of repository 107.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventor from claiming rights to such combinations.

What is claimed is:

1. A method for localizing a mobile device having a processor and a memory, the method comprising:
    monitoring, using the processor and the memory, mobile device barometric data along a sequence of positions describing a route being traversed;
    accessing, using the processor, a repository of barometric fingerprint data associated with respective positions including the route, the repository being stored at one of,
        a server computing device communicatively accessible to mobile device; and
        the memory of the mobile device, wherein the repository is derived from the server computing device; and
    using the processor, localizing the mobile device based at least in part on matching a mobile device barometric pattern segment with a correlating pattern segment of the barometric fingerprint data of the repository, the mobile device barometric pattern segment derived at least partly based on ambient barometric pressure measurements associated with at least a pair of contiguous positions in the sequence of positions describing the route, and wherein the mobile device barometric pattern segment uniquely correlates to the at least a pair of contiguous positions in the sequence of positions.

2. The method of claim 1 further comprising identifying a floor number of a multi-floor building that at least partially includes the route, and wherein the barometric pattern segment is associated with the floor number.

3. The method of claim 1 wherein the localizing comprises, based on the matching, identifying a position of the mobile device among the associated positions along the route.

4. The method of claim 1 further comprising, prior to the matching, algorithmically smoothing the mobile device barometric data of the barometric pattern segment.

5. The method of claim 1 wherein the mobile device is one of a smartphone, a wireless communication device and a wearable computing device.

6. The method of claim 5 wherein the repository is one of accessible in the memory and accessible from a server computing device via a wireless communication network.

7. The method of claim 1 wherein the route being traversed comprises at least one of a hallway, a corridor, a pedestrian path, a set of stairs and a route commencing from at least an entrance of a building.

8. The method of claim 1 wherein the repository further includes at least one of wireless signal strength data, wireless connectivity data, accelerometer data, gyroscope data, magnetometer data and ambient lighting sensor data associated with the respective positions along the route.

9. The method of claim 1 further comprising adding the mobile device barometric data to the barometric fingerprint data of the repository.

10. A mobile device comprising:
    a processor; and
    a memory storing a set of instructions, the instructions executable in the processor to:
        monitor, using the processor and the memory, mobile device barometric data along a sequence of positions describing a route being traversed;
        access, using the processor, a repository of barometric fingerprint data associated with respective positions including the route, the repository being stored at one of,
            a server computing device communicatively accessible to mobile device; and
            the memory of the mobile device, wherein the repository is derived from the server computing device; and
        using the processor, localize the mobile device based at least in part on matching a mobile device barometric pattern segment with a correlating pattern segment of the barometric fingerprint data of the repository, the mobile device barometric pattern segment derived at least partly based on ambient barometric pressure measurements associated with at least a pair of contiguous positions in the sequence of positions describing the route, and wherein the mobile device barometric pattern segment uniquely correlates to the at least a pair of contiguous positions in the sequence of positions.

11. The mobile device of claim 10 further comprising identifying a floor number of a multi-floor building that at least partially includes the route, and wherein the barometric pattern segment is associated with the floor number.

12. The mobile device of claim 10 wherein the localizing comprises, based on the matching, identifying a position of the mobile device among the associated positions along the route.

13. The mobile device of claim 10 further comprising, prior to the matching, algorithmically smoothing the mobile device barometric data of the barometric pattern segment.

14. The mobile device of claim 10 wherein the mobile device is one of a smartphone, a wireless communication device and a wearable computing device.

15. The mobile device of claim 10 wherein the repository is one of accessible in the memory and accessible from a server computing device via a wireless communication network.

16. The mobile device of claim 10 wherein the route being traversed comprises at least one of a hallway, a corridor, a pedestrian path, a set of stairs and a route commencing from at least an entrance of a building.

17. The mobile device of claim 10 wherein the repository further includes at least one of wireless signal strength data, wireless connectivity data, accelerometer data, gyroscope data, magnetometer data and ambient lighting sensor data associated with the positions along the route.

18. The mobile device of claim 10 further comprising adding the mobile device barometric data to the barometric fingerprint data of the repository.

* * * * *